(12) United States Patent
Pulleti

(10) Patent No.: US 12,238,123 B2
(45) Date of Patent: Feb. 25, 2025

(54) SYSTEM AND METHOD TO IDENTIFY CYBER THREAT INTELLIGENCE FROM A GROUP OF INFORMATION

(71) Applicant: CYBLE INC., Alpharetta, GA (US)

(72) Inventor: Uday Kiran Pulleti, Machilipatnam (IN)

(73) Assignee: CYBLE INC.

( * ) Notice: Subject to any disclaimer, the term of this patent is extended or adjusted under 35 U.S.C. 154(b) by 236 days.

(21) Appl. No.: 18/051,071

(22) Filed: Oct. 31, 2022

(65) Prior Publication Data
US 2024/0146744 A1    May 2, 2024

(51) Int. Cl.
*H04L 9/40*         (2022.01)
*H04L 41/16*       (2022.01)

(52) U.S. Cl.
CPC .......... *H04L 63/1416* (2013.01); *H04L 41/16* (2013.01); *H04L 63/1433* (2013.01)

(58) Field of Classification Search
CPC .. H04L 63/1426; H04L 41/16; H04L 63/1433
See application file for complete search history.

(56) References Cited

U.S. PATENT DOCUMENTS

| | | | | |
|---|---|---|---|---|
| 11,748,577 | B1* | 9/2023 | Aberle | G06F 40/30 |
| | | | | 704/9 |
| 2014/0283055 | A1* | 9/2014 | Zahran | G06F 16/353 |
| | | | | 726/23 |
| 2020/0050966 | A1 | 2/2020 | Enuka et al. | |
| 2020/0336508 | A1* | 10/2020 | Srivastava | H04L 63/20 |
| 2021/0004485 | A1 | 1/2021 | Summers et al. | |
| 2021/0056211 | A1 | 2/2021 | Olson et al. | |

FOREIGN PATENT DOCUMENTS

WO       2021081464 A1    4/2021

* cited by examiner

*Primary Examiner* — Viet D Vu
(74) *Attorney, Agent, or Firm* — Jason C. Cameron

(57) ABSTRACT

A system to identify cyber threat intelligence from a group of information is disclosed. The system includes a processing subsystem including a data sourcing module to fetch information. The processing subsystem includes a data processing module to extract textual information from the information. The processing subsystem includes a machine learning module including an entity analysis module to fragment the textual information to obtain entities. The entity analysis module is to analyze a label assigned to each of the entities to generate a first threat score. The machine learning module includes a semantic analysis module to summarize the entities to obtain a summarized text. The semantic analysis module is to evaluate sentiments pertaining to the summarized text. The semantic analysis module is configured to analyze the sentiments to generate a second threat score. The machine learning module includes a classifier module to classify the textual information categories.

19 Claims, 6 Drawing Sheets

SYSTEM AND METHOD TO IDENTIFY CYBER THREAT INTELLIGENCE FROM A GROUP OF INFORMATION

FIELD OF INVENTION

Embodiments of the present disclosure relate to the field of cyber security and more particularly to a system and method to identify cyber threat intelligence from a group of information.

BACKGROUND

Cyber threat intelligence is knowledge, skills and experience-based information concerning the occurrence and assessment of cyber threats and threat actors that are intended to help mitigate potential attacks and harmful events occurring in cyberspace. Security analysts responding to the cyber threats require data corresponding to each of the cyber threats to deploy countermeasures proactively.

Recently, the frequency and complexity level of cyber threats has increased with respect to threats performed against organizations. Typically, every organization has a unique set of challenges when it comes to the implementation of information security infrastructure. One of the most important cyber security requirements for an organization is the visibility of actionable Cyber Threat Intelligence (CTI) in a timely manner. Two main problems that arise in CTI involves in identification of CTI from the vast amount of data that is being opened through the Internet. Another problem is the determination and classification of threat criticality specific for the organization.

It is essential that CTI must be accurate with reference to the vast amount of data and nature of cyber threat. Therefore, it is critical to define the cyber threats relevant to each organization and identify those threats accurately from the vast amount of data that is being generated daily.

Currently, the data corresponding to each of the cyber threat is extracted from sources such as the deep web, open web and dark web using a keyword-based search technique.

The keyword-based search technique may generate search results that are irrelevant to the security analysts. Also, the keyword-based search technique fails to generate the search results, which may be perceived as the cyber threats to a specific organization. Another concern is the possibility of non-appearance of the information relevant to the cyber threats in the search results due to the omission of particular keywords.

Hence, there is a need for a system and method to identify cyber threat intelligence from a group of information to address the aforementioned issue(s).

BRIEF DESCRIPTION

In accordance with an embodiment of the present disclosure, a system to identify cyber threat intelligence from a group of information is provided. The system includes a processing subsystem hosted on a server and configured to execute on a network to control bidirectional communications among a plurality of modules. The processing subsystem includes a data sourcing module operatively coupled to an integrated database. The data sourcing module is configured to fetch the group of information from one or more web sources. The processing subsystem also includes a data processing module operatively coupled to the data sourcing module. The data processing module is configured to segregate the group of information fetched by the data sourcing module into one or more corresponding datatypes. The data processing module is also configured to extract textual information from the group of information segregated into the one or more corresponding datatypes. The textual information includes at least one of a structured text, and an unstructured text. The processing subsystem also includes a machine learning module operatively coupled to the data processing module. The machine learning module includes an entity analysis module operatively coupled to the data processing module. The entity analysis module is configured to fragment the textual information extracted by the data processing module to obtain one or more entities including at least one of a noun, noun phrase, verb, verb phrase, adjective, and adjective phrase.

The entity analysis module is also configured to assign a label to each of the one or more entities obtained upon comparing the one or more entities with one or more corresponding datasets stored in the integrated database. The entity analysis module is further configured to analyze the label assigned to each of the one or more entities to generate a first threat score. The first threat score is indicative of a status of the textual information including at least one of a threat and a non-threat. The machine learning module also includes a semantic analysis module operatively coupled to the entity analysis module. The semantic analysis module is configured to summarize the one or more entities without altering a collective meaning of the one or more entities to obtain a summarized text. The semantic analysis module is further configured to evaluate one or more sentiments pertaining to the summarized text by performing one or more sentiment analysis techniques. The semantic analysis module is also configured to analyze the one or more sentiments evaluated to generate a second threat score. The second threat score is indicative of a status of the one or more sentiments evaluated. The status includes at least one of the threat and the non-threat. The machine learning module further includes a classifier module operatively coupled to the semantic analysis module and the entity analysis module. The classifier module is configured to classify the textual information extracted by the data processing module into one or more categories including at least one of the threat and the non-threat, thereby identifying the cyber threat intelligence from the group of information.

In accordance with another embodiment of the present disclosure, a method to identify cyber threat intelligence from a group of information is provided. The method includes fetching, by a data sourcing module, a group of information from one or more web sources. The method also includes segregating, by the data processing module, the group of information fetched by the data sourcing module into one or more corresponding datatypes. The method further includes extracting, by the data processing module, textual information from the group of information segregated into the one or more corresponding datatypes. The textual information includes at least one of a structured text, and an unstructured text. The method also includes fragmenting, by an entity analysis module of a machine learning module, the textual information extracted by the data processing module to obtain one or more entities comprising at least one of a noun, noun phrase, verb, verb phrase, adjective, and adjective phrase. The method also includes assigning, by the entity analysis module of the machine learning module, a label to each of the one or more entities obtained upon comparing the one or more entities with one or more corresponding datasets stored in the integrated database.

The method also includes analyzing, by the entity analysis module of the machine learning module, the label assigned to each of the one or more entities to generate a first threat score. The first threat score is indicative of a status of the textual information comprising at least one of a threat and a non-threat. The method also includes summarizing, by a semantic analysis module of the machine learning module, the one or more entities without altering a collective meaning of the one or more entities to obtain a summarized text. The method also includes evaluating, by a semantic analysis module of the machine learning module, one or more sentiments pertaining to the summarized text by performing one or more sentiment analysis techniques. The method also includes analyzing, by a semantic analysis module of the machine learning module, the one or more sentiments evaluated to generate a second threat score. The second threat score is indicative of a status of the one or more sentiments evaluated. The status includes at least one of the threat and the non-threat. The method further includes classifying, by a classifier module, the textual information extracted by the data processing module into one or more categories comprising at least one of the threat and the non-threat, thereby identifying the cyber threat intelligence from the group of information.

In accordance with another embodiment of the present disclosure, a non-transitory computer-readable medium storing a computer program that, when executed by a processor, causes the processor to perform a method to identify cyber threat intelligence from a group of information is provided. The method includes fetching, by a data sourcing module, a group of information from one or more web sources. The method also includes segregating, by the data processing module, the group of information fetched by the data sourcing module into one or more corresponding datatypes. The method further includes extracting, by the data processing module, textual information from the group of information segregated into the one or more corresponding datatypes. The textual information includes at least one of a structured text, and an unstructured text. The method also includes fragmenting, by an entity analysis module of a machine learning module, the textual information extracted by the data processing module to obtain one or more entities comprising at least one of a noun, noun phrase, verb, verb phrase, adjective, and adjective phrase. The method also includes assigning, by the entity analysis module of the machine learning module, a label to each of the one or more entities obtained upon comparing the one or more entities with one or more corresponding datasets stored in the integrated database.

The method also includes analyzing, by the entity analysis module of the machine learning module, the label assigned to each of the one or more entities to generate a first threat score. The first threat score is indicative of a status of the textual information comprising at least one of a threat and a non-threat. The method also includes summarizing, by a semantic analysis module of the machine learning module, the one or more entities without altering a collective meaning of the one or more entities to obtain a summarized text. The method also includes evaluating, by a semantic analysis module of the machine learning module, one or more sentiments pertaining to the summarized text by performing one or more sentiment analysis techniques. The method also includes analyzing, by a semantic analysis module of the machine learning module, the one or more sentiments evaluated to generate a second threat score. The second threat score is indicative of a status of the one or more sentiments evaluated. The status includes at least one of the threat and the non-threat. The method further includes classifying, by a classifier module, the textual information extracted by the data processing module into one or more categories comprising at least one of the threat and the non-threat, thereby identifying the cyber threat intelligence from the group of information To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
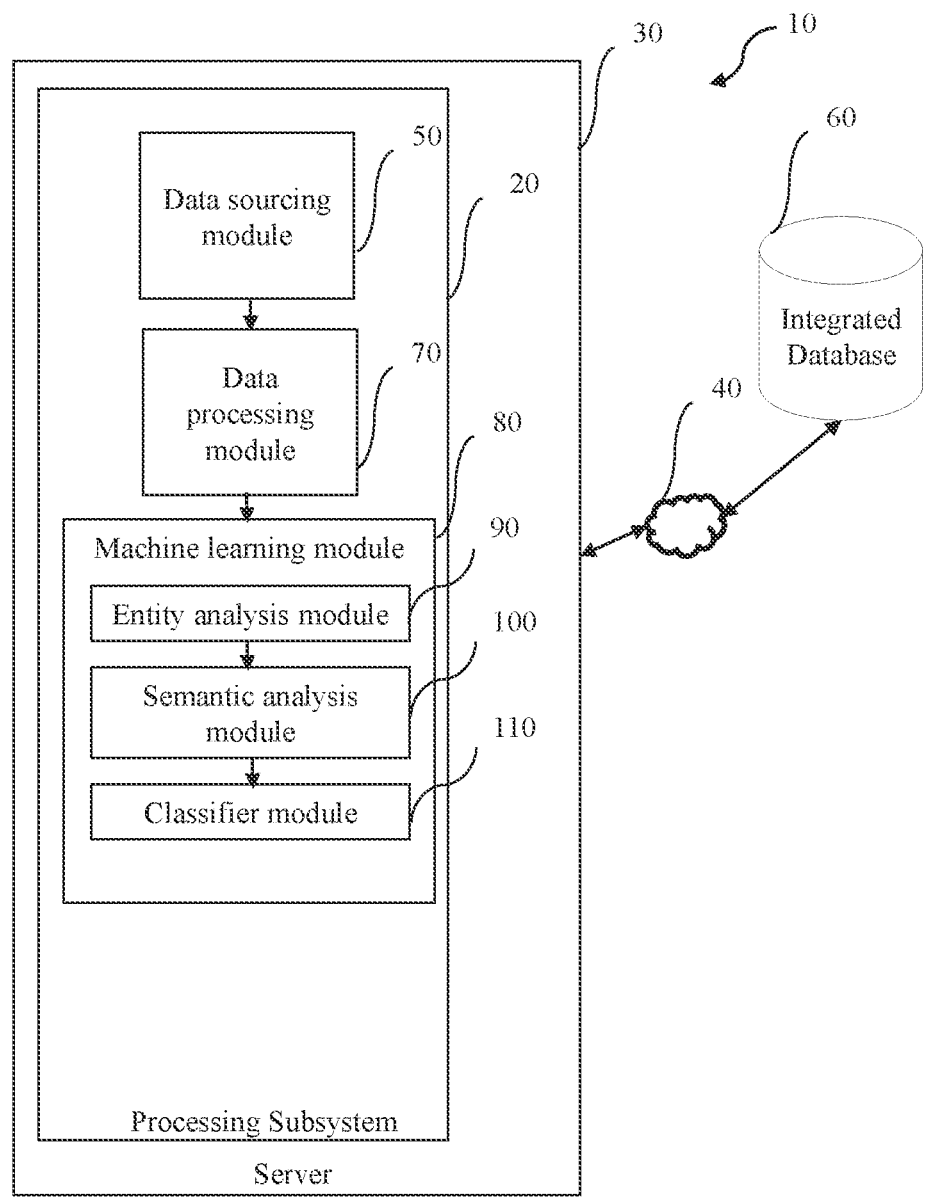
FIG. 1 is a block diagram representation of a system to identify cyber threat intelligence from a group of information in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to identify cyber threat intelligence from a group of information. The system includes a processing subsystem hosted on a server and configured to execute on a network to control bidirectional communications among a plurality of modules. The processing subsystem includes a data sourcing module operatively coupled to an integrated database. The data sourcing module is configured to fetch the group of information from one or more web sources. The processing subsystem also includes a data processing module operatively coupled to the data sourcing module. The data processing module is configured to segregate the group of information fetched by the data sourcing module into one or more corresponding datatypes. The data processing module is also configured to extract textual information from the group of information segregated into the one or more corresponding datatypes. The textual information includes at least one of a structured text, and an unstructured text. The processing subsystem also includes a machine learning module operatively coupled to the data processing module. The machine learning module includes an entity analysis module operatively coupled to the data processing module.

The entity analysis module is configured to fragment the textual information extracted by the data processing module to obtain one or more entities including at least one of a noun, noun phrase, verb, verb phrase, adjective, and adjective phrase. The entity analysis module is also configured to assign a label to each of the one or more entities obtained upon comparing the one or more entities with one or more corresponding datasets stored in the integrated database. The entity analysis module is further configured to analyze the label assigned to each of the one or more entities to generate a first threat score. The first threat score is indicative of a status of the textual information including at least one of a threat and a non-threat. The machine learning module also includes a semantic analysis module operatively coupled to the entity analysis module. The semantic analysis module is configured to summarize the one or more entities without altering a collective meaning of the one or more entities to obtain a summarized text. The semantic analysis module is further configured to evaluate one or more sentiments pertaining to the summarized text by performing one or more sentiment analysis techniques. The semantic analysis module is also configured to analyze the one or more sentiments evaluated to generate a second threat score. The second threat score is indicative of a status of the one or more sentiments evaluated. The status includes at least one of the threat and the non-threat. The machine learning module further includes a classifier module operatively coupled to the semantic analysis module and the entity analysis module. The classifier module is configured to classify the textual information extracted by the data processing module into one or more categories including at least one of the threat and the non-threat, thereby identifying the cyber threat intelligence from the group of information.

FIG. 1 is a block diagram representation of a system 10 to identify cyber threat intelligence from a group of information in accordance with an embodiment of the present disclosure. The system 10 includes a processing subsystem 20. The processing subsystem 20 is hosted on a server 30. In one embodiment, the server 30 may be a cloud-based server. In another embodiment, the server 30 may be a local server. The processing subsystem 20 is configured to execute on a network 40 to control bidirectional communications among a plurality of modules. In one embodiment, the network 40 may include one or more terrestrial and/or satellite networks interconnected to communicatively connect a user device to web server engine and a web crawler. In one example, the network 40 may be a private or public local area network (LAN) or wide area network, such as the internet.

Moreover, in another embodiment, the network 40 may include both wired and wireless communications according to one or more standards and/or via one or more transport mediums. In one example, the network 40 may include wireless communications according to one of the 802.11 or Bluetooth specification sets, LoRa (Long Range Radio) or another standard or proprietary wireless communication protocol. In yet another embodiment, the network 40 may also include communications over a terrestrial cellular network, including, a GSM (global system for mobile communications), CDMA (code division multiple access), and/or EDGE (enhanced data for global evolution) network.

Further, the processing subsystem 20 includes a data sourcing module 50 operatively coupled to an integrated database 60. In one embodiment, the integrated database 60 may include, but not limited to, an SQL database, a non-SQL database, a hierarchical database, a columnar database and the like. The data sourcing module 50 is configured to fetch the group of information from one or more web sources. As used herein, the group of information may include, news snippets, visuals, images, audio files, information from web forums, information from telegram channels and the like. In a specific embodiment, the one or more web sources may include open web, deep web and dark web. In one embodiment, the data sourcing module 50 may be configured to employ a vector embedding technique to fetch the group of information based on a predefined search key. In some embodiments, the data sourcing module may sample the group of information from the one or more web sources by at least one of a sampling technique including simple random sampling, stratified sampling, cluster sampling, multistage sampling, systematic sampling, convenience sampling, consecutive sampling, purposive sampling, and quota sampling.

Furthermore, the processing subsystem 20 also includes a data processing module 70 operatively coupled to the data sourcing module 50. The data processing module 70 is configured to segregate the group of information fetched by the data sourcing module 50 into one or more corresponding datatypes. In one embodiment, the one or more corresponding datatypes may include text, power point presentation, portable document format (PDF), image, audio, video, and database. The data processing module 70 is also configured to extract textual information from the group of information segregated into the one or more corresponding datatypes.

The textual information includes at least one of a structured text, and an unstructured text. In a specific embodiment, the structured text may include comma separated values and java script object notification. Consider a scenario in which the data sourcing module 50 may fetch a PDF file from the telegram channel. The data processing module 70 may extract textual information contained in the PDF file. For example, the textual information extracted from the PDF file may include 'Bob's email got hacked because of which his credit card compromised'.

Additionally, the processing subsystem 20 also includes a machine learning module 80 operatively coupled to the data processing module 70. The machine learning module 80 includes an entity analysis module 90 operatively coupled to the data processing module 70. The entity analysis module 90 is configured to fragment the textual information extracted by the data processing module 70 to obtain one or more entities including at least one of a noun, noun phrase, verb, verb phrase, adjective, and adjective phrase. In continuation with the ongoing example, the entity analysis module 90 may split the textual information 'Bob's email got hacked because of which his credit card compromised' in to one or more entities such as 'Bob', 'email', 'hacked', 'credit card' and 'compromised'.

Further, the entity analysis module 90 is also configured to assign a label to each of the one or more entities obtained upon comparing the one or more entities with one or more corresponding datasets stored in the integrated database 60. In one embodiment, the one or more corresponding datasets may include keywords that may be perceived as a potential threats for a particular organization. In continuation with the ongoing example, the entity analysis module 90 may assign labels to the one or more entities as follows: 'Bob=0', 'email=1', 'hacked=1', 'credit card=0' and 'compromised=1'.

Additionally, the entity analysis module 90 is further configured to analyze the label assigned to each of the one or more entities to generate a first threat score. The first threat score is indicative of a status of the textual information including at least one of a threat and a non-threat. In continuation with the ongoing example, the entity analysis module 90 may generate the first score by adding the positive labels and dividing it by total number of entities. The first score generated may be $3/5$ for the example considered.

Moreover, in one embodiment, the entity analysis module 90 may be trained by one or more machine learning techniques to classify the one or more entities into one or more categories including at least one of the threat and the non-threat. In such an embodiment, the one or more machine learning techniques may include provide one or more textual information including a corresponding label to the entity analysis module 90. The one or more textual information may include one or more corresponding entities. The one or more machine learning techniques may also assign the corresponding label of the one or more corresponding textual information to each of the one or more corresponding entities extracted. The one or more machine learning techniques may further include calculate a threshold value corresponding to the one or more entities extracted based on the corresponding label assigned.

Additionally, the one or more machine learning techniques may also classify the one or more entities into one or more categories based on the corresponding threshold value calculated. In a specific embodiment, the one or more machine learning techniques may include, but not limited to, linear regression, logistic regression, decision tree, SVM technique, naive bayes technique, KNN technique, K-means, random forest technique, and the like.

Further, in one embodiment, the entity analysis module 90 may be configured to generate the first threat score corresponding to each of the one or more entities. In some embodiments, the entity analysis module 90 may be configured to generate the first threat score upon grouping the one or more entities as monograms, bigrams, and trigrams. The training process may be explained in detail as follows. The one or more textual information may be related to an organization named 'ourorg' and the entity analysis module 90 may be trained to detect the one or more entities that may be perceived as a threat to the organization. The one or more textual information provided, the one or more entities extracted from the one or more corresponding textual information, the label assigned to the one or more corresponding entities, calculation of the threshold value is shown in Table. 1.

| | Organization Ourorg | |
|---|---|---|
| One or more textual information | Label (1 = threat 0 = nonthreat) | One or more entities extracted, and the labels assigned |
| Rohan's email abc@ourorg.com got swooshed and his credit card compromised | 1 | Rohan = 1 email = 1 abc@ourorg.com = 1 swoosh = 1 credit card = 1 compromised = 1 |
| zzz customer helpline is hg@ourorg.com for any of your credit card related issues | 0 | zzz = 0 customer helpline = 0 email = 0 hg@ourorg.com = 0 credit card = 0 |
| Raju's email ssd@ourorg.com had a swoosh attack and his credit card was compromised | 1 | raju = 1 email = 1 ssd@ourorg.com = 1 credit card = 1 swoosh = 1 attack = 1 compromised = 1 |
| Mary's credit card got stolen and used illegally | 0 | Mary = 0 Credit card = 0 Stolen = 0 Illegally = 0 |
| Rahul hacked the bank and got all their credit cards | 0 | Rahul = 0 Hacked = 0 Bank = 0 Credit card = 0 |
| Calculation of the threshold value | | Inference based on a benchmark value of 0.5 |
| Email | $2/3 = 0.66$ | Potential threat |
| Swoosh | $2/2 = 1$ | Potential threat |
| Credit card | $2/5 = 0.4$ | Not a threat |

Table.1 illustrates the one or more textual information provided, the one or more entities extracted from the one or more corresponding textual information, the label assigned to the one or more corresponding entities and calculation of the threshold value Furthermore, the machine learning module 80 also includes a semantic analysis module 100 operatively coupled to the entity analysis module 90. The semantic analysis module 100 is configured to summarize the one or more entities without altering a collective meaning of the one or more entities to obtain a summarized text. In one embodiment, the semantic analysis module 100 may be configured to summarize the one or more entities by at least one of a technique comprising extractive summarization and abstractive summarization. Consider the example of the textual information 'Bob's email got hacked because of which his credit card compromised' and the one or more entities extracted from the textual information is 'Bob', 'email', 'hacked', 'credit card' and 'compromised'. The semantic analysis module 100 may summarize the one or more entities as 'Bob's email got hacked and his credit card compromised'.

Moreover, the semantic analysis module 100 is further configured to evaluate one or more sentiments pertaining to the summarized text by performing one or more sentiment analysis techniques. In one embodiment, the one or more sentiment analysis techniques may include native bayes technique, valence aware dictionary technique, long short term memory technique. In some embodiments, the one or more sentiments may include a positive sentiment, and a negative sentiment. In such an embodiment, the positive sentiment, and the negative sentiment may include a contextual meaning comprising the threat, and the non-threat respectively. The semantic analysis module 100 is also configured to analyze the one or more sentiments evaluated to generate a second threat score.

Additionally, the second threat score is indicative of a status of the one or more sentiments evaluated. The status includes at least one of the threat and the non-threat. In continuation with the ongoing example, the semantic analysis module 100 may generate the second threat score by evaluating the one or more sentiments of the summarized text: 'Bob's email got hacked and his credit card compromised'. The semantic analysis module 100 may generate the second threat score corresponding to a potential threat upon evaluating the sentiment of the summarized text as the positive sentiment. Consider a scenario in which the benchmark value distinguishing the threat and the non-threat may be 0.5 and the semantic analysis module 100 may generate the second threat score higher than 0.5 for the summarized text.

Further, in one embodiment, the semantic analysis module 100 may be trained by one or more machine learning techniques to generate the second threat score by analyzing the one or more sentiments. In one embodiment, the one or more machine learning techniques may include provide one or more textual information including threat data to the semantic analysis module 100. The one or more machine learning techniques may also compare one or more sentiments of the summarized text with the one or more sentiments of the one or more textual information provided. The one or more machine learning techniques may further generate the second threat score corresponding to the summarized text upon matching the one or more sentiments of the summarized text with the one or more sentiments of the one or more textual information provided. In one embodiment, the entity analysis module 90 and the semantic analysis module 100 may employ one or more corresponding weighted functions to generate the first threat score and the second threat score.

Moreover, the machine learning module 80 further includes a classifier module 110 operatively coupled to the semantic analysis module 100 and the entity analysis module 90. The classifier module 110 is configured to classify the textual information extracted by the data processing module 70 into one or more categories including at least one of the threat and the non-threat, thereby identifying the cyber threat intelligence from the group of information. In one embodiment, the classifier module 110 may be configured to classify the textual information as the threat when at least one of the first threat score and the second threat score is above a predefined threshold. In continuation with the ongoing example, since the first threat score and the second score is above the predefined threshold that is 0.5, the classifier module 110 may classify the textual information as the threat.

Figure 2:
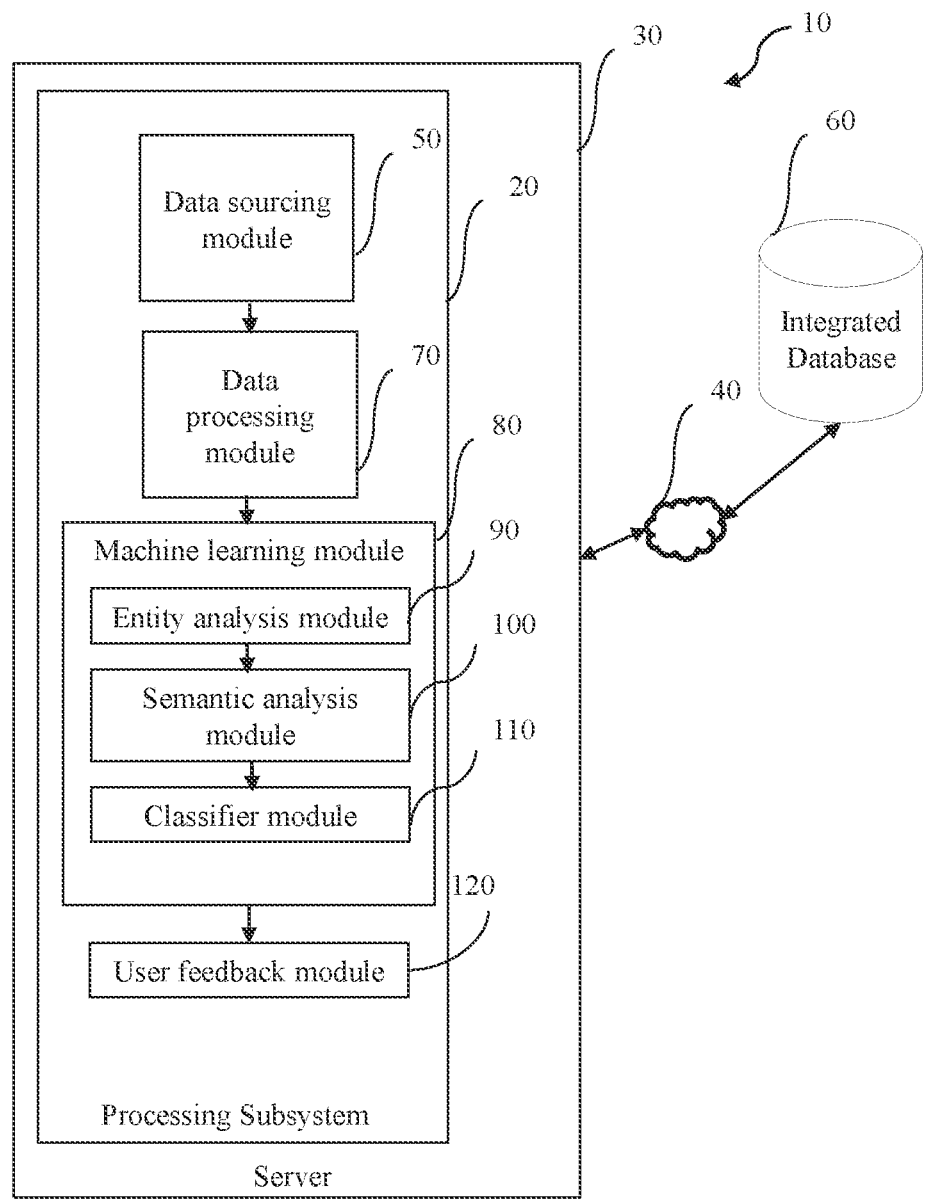
FIG. 2 is a block diagram representation of one embodiment of the system of FIG. 1, in accordance with an embodiment of the present disclosure.

FIG. 2 is a block diagram representation of one embodiment of the system 10 of FIG. 1, in accordance with an embodiment of the present disclosure. The system 10 of FIG. 1 includes the data sourcing module 50, the data processing module 70, the machine learning module 80, the entity analysis module 90, the semantic analysis module 100 and the classifier module 110. In one embodiment, the system 10 of FIG. 1 may include the processing subsystem 20 including user feedback module 120 configured to finetune the first threat score generated by the entity analysis module 90, the second threat score generated by the semantic analysis module 100, and the classification done by the classifier module 110 upon receiving one or more inputs from one or more corresponding users. In such an embodiment, the user feedback module 120 may be configured to finetune the first threat score, the second threat score, and the classification done by the classifier module 110 based on an organization specific data upon receiving one or more inputs from the one or more corresponding users.

Further, in one embodiment, the one or more inputs may include, an alternate label, a change of weight in the weighted function and the like. In continuation with the ongoing example, consider a scenario in which a user X may think that entity 'email' is not a threat, and the label assigned by the entity analysis module 90 to the entity 'email' needs to be changed from 1 to 0 to fine tune the first threat score. In such a scenario, the user feedback module 120 may enable the user X to modify the label assigned to the entity 'email'.

Figure 3:
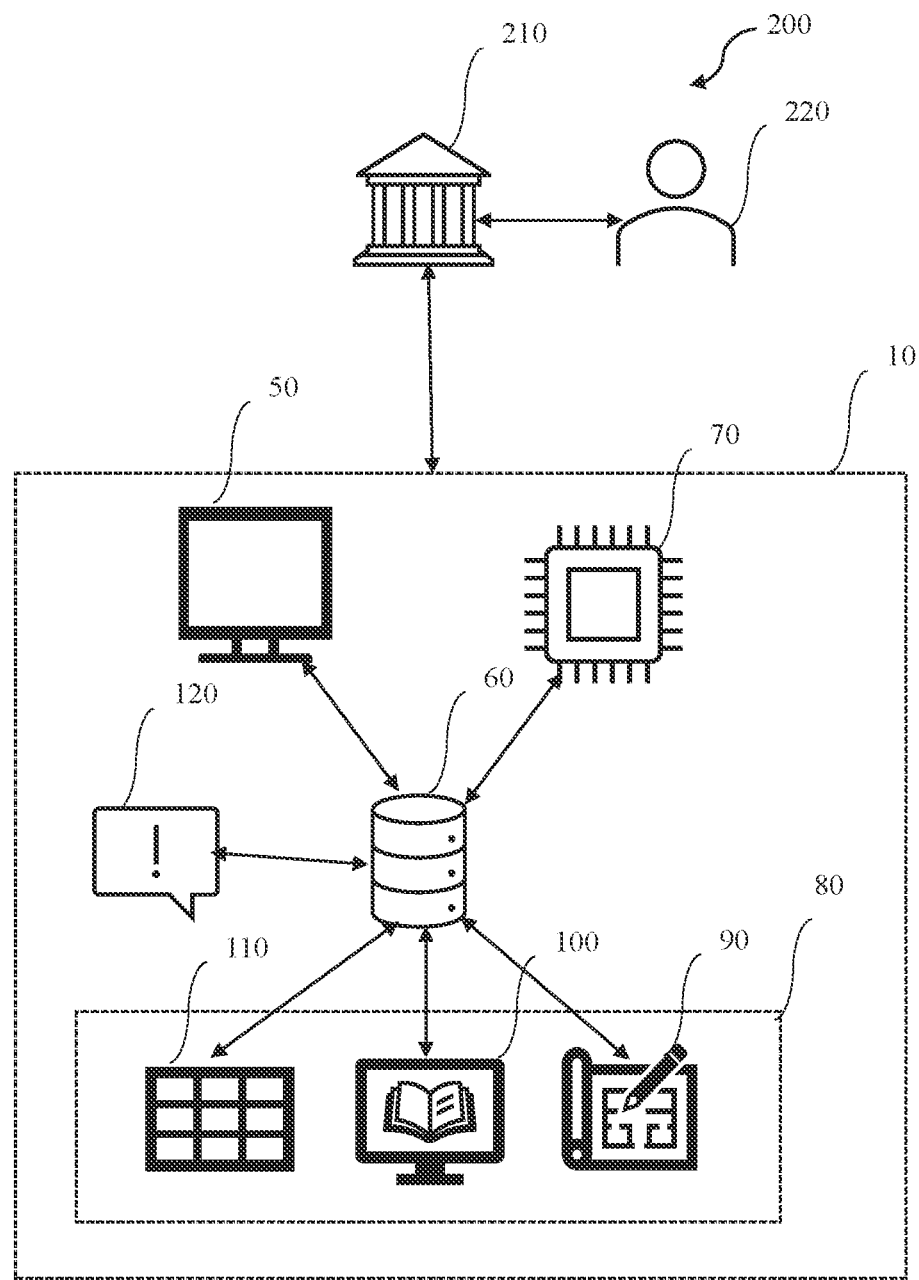
FIG. 3 is a schematic representation of an exemplary embodiment of the system of FIG. 1, in accordance with an embodiment of the present disclosure.

FIG. 3 is a schematic representation of an exemplary embodiment 200 of the interactive system 10 of FIG. 1 in accordance with an embodiment of the present disclosure. Consider a scenario in which an organization Y 210 may be looking to identify cyber threat intelligence relevant to the organization Y 210. Organization Y 210 may be a credit card service provider. The data sourcing module 50 may fetch the group of information from the open web, the deep web and the dark web. The group of information may include, but not limited to, news regarding credit card theft, discussions happening in web forums, information being exchanged in telegram channels and the like. The group of information may include visuals, text files, audio files, multimedia files and the like.

Further, the data processing module 70 may segregate the group of information fetched into one or more corresponding datatypes. The data processing module 70 may extract textual information from the group of information segregated. Consider a scenario in which the textual information extracted from the group of information may include 'Jithin's email got swooshed and his credit card compromised'. The entity analysis module 90 associated with the machine learning module 80 may fragment the textual information to obtain one or more entities. The one or more entities obtained may include 'Jithin', 'email', 'swoosh', 'credit card', and 'compromised'. The entity analysis module 90 may further assign a label to each of the one or more entities obtained upon comparing the one or more entities with the one or more corresponding datasets stored in the integrated database 60. The labels assigned to the one or more entities may be as follows—'Jithin=1', 'email=1', 'swoosh=1', 'credit card=1', and 'compromised=1'.

Furthermore, the entity analysis module 90 may generate the first threat score upon analyzing the label assigned to each of the one or more entities. The first threat score may be calculated by adding all positive labels and dividing it by the total number, for example/5=1. The semantic analysis module 100 may further summarize the one or more entities and evaluate the same to find out the underlaying aspect of the summarized text. The semantic analysis module 100 may generate the second threat score based on the one or more sentiments associated with the summarized text. Consider a scenario in which the semantic analysis module 100 may perceive the textual information 'Jithin's email got swooshed and his credit card compromised' as the non-threat. The second threat score generated by the semantic analysis module 100 may be a less score 0.4 compared to a benchmark score 0.5 that may be used to distinguish the threats and the non-threats.

Moreover, the classifier module 110 may further classify the textual information as the threat since the first threat score is greater than the benchmark value 0.5. The classifier module 110 may also be configured to classify the textual information as the threat when both of the first threat score and the second threat score is above the benchmark value. Consider another scenario in which, a person Z 220 associated with the organization Y 210 may feel that the assessment made by the semantic analysis module 100 while generating the second threat score is sluggish and needs correction. The user feedback module 120 may enable the person Z 220 to alter the second score by providing the one or more inputs to finetune the performance of the semantic analysis module 100. The system 10 associated with multiple organizations may be clubbed together to identify cyber threat intelligence in a global scenario.

Figure 4:
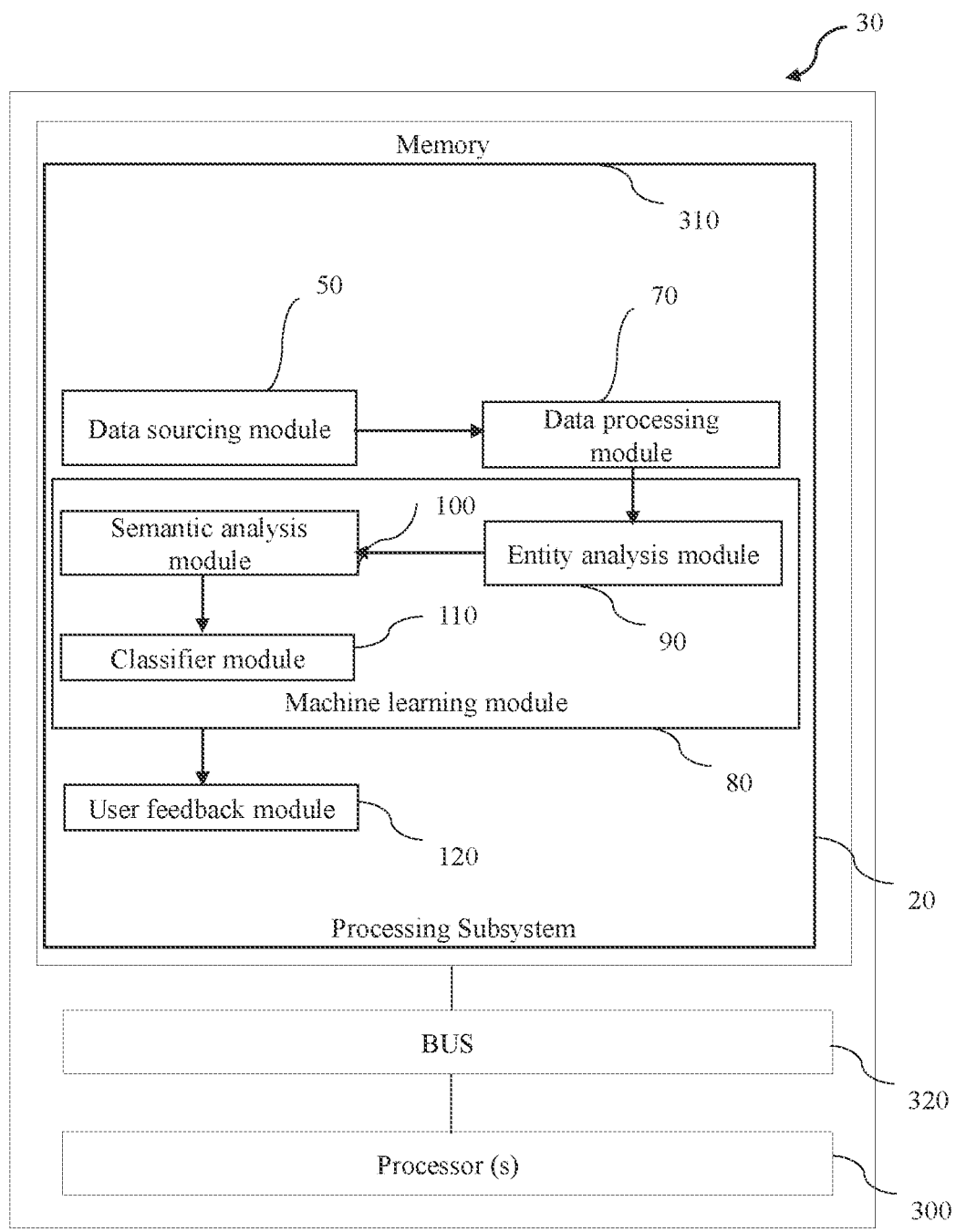
FIG. 4 is a block diagram of a computer or a server in accordance with an embodiment of the present disclosure.

FIG. 4 is a block diagram of a computer or a server 30 in accordance with an embodiment of the present disclosure. The server 30 includes processor(s) 300, and memory 310 operatively coupled to the bus 320. The processor(s) 300, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 310 includes several subsystems stored in the form of computer-readable medium which instructs the processor to perform the method steps illustrated in FIG. 1. The memory 310 is substantially similar to system 10 of FIG. 1. The memory 310 has the following subsystems: the processing subsystem 20 including the data sourcing module 50, the data processing module 70, the machine learning module 80, the entity analysis module 90, the semantic analysis module 100, the classifier module 110 and the user feedback module 120. The plurality of modules of the processing subsystem 20 performs the functions as stated in FIG. 1 and FIG. 2. The bus 320 as used herein refers to be the internal memory channels or computer network that is used to connect computer components and transfer data between them. The bus 320 includes a serial bus or a parallel bus, wherein the serial bus transmit data in bit-serial format and the parallel bus transmit data across multiple wires. The bus 320 as used herein, may include but not limited to, a system bus, an internal bus, an external bus, an expansion bus, a frontside bus, a backside bus, and the like.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

The processing subsystem 20 includes a data sourcing module 50 operatively coupled to an integrated database 60. The data sourcing module 50 is configured to fetch the group of information from one or more web sources. The processing subsystem 20 also includes a data processing module 70 operatively coupled to the data sourcing module 50. The data processing module 70 is configured to segregate the group of information fetched by the data sourcing module 50 into one or more corresponding datatypes. The data processing module 70 is also configured to extract textual information from the group of information segregated into the one or more corresponding datatypes. The textual information includes at least one of a structured text, and an unstructured text. The processing subsystem 20 also includes a machine learning module 80 operatively coupled to the data processing module 70. The machine learning module 80 includes an entity analysis module 90 operatively coupled to the data processing module. The entity analysis module 90 is configured to fragment the textual information extracted by the data processing module 70 to obtain one or more entities including at least one of a noun, noun phrase, verb, verb phrase, adjective, and adjective phrase. The entity analysis module 90 is also configured to assign a label to each of the one or more entities obtained upon comparing the one or more entities with one or more corresponding datasets stored in the integrated database 60. The entity analysis module 90 is further configured to analyze the label assigned to each of the one or more entities to generate a first threat score.

The first threat score is indicative of a status of the textual information including at least one of a threat and a non-threat. The machine learning module 80 also includes a semantic analysis module 100 operatively coupled to the entity analysis module 90. The semantic analysis module 100 is configured to summarize the one or more entities without altering a collective meaning of the one or more entities to obtain a summarized text. The semantic analysis module 100 is further configured to evaluate one or more sentiments pertaining to the summarized text by performing one or more sentiment analysis techniques. The semantic analysis module 100 is also configured to analyze the one or more sentiments evaluated to generate a second threat score. The second threat score is indicative of a status of the one or more sentiments evaluated. The status includes at least one of the threat and the non-threat. The machine learning module 80 further includes a classifier module 110 operatively coupled to the semantic analysis module 100 and the entity analysis module 90. The classifier module 110 is configured to classify the textual information extracted by the data processing module 70 into one or more categories including at least one of the threat and the non-threat, thereby identifying the cyber threat intelligence from the group of information. The processing subsystem 20 also includes a user feedback module 120 configured to finetune the first threat score generated by the entity analysis module 90, the second threat score generated by the semantic analysis module 100, and the classification done by the classifier module 110 upon receiving one or more inputs from one or more corresponding users.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 300.

Figure 5A:
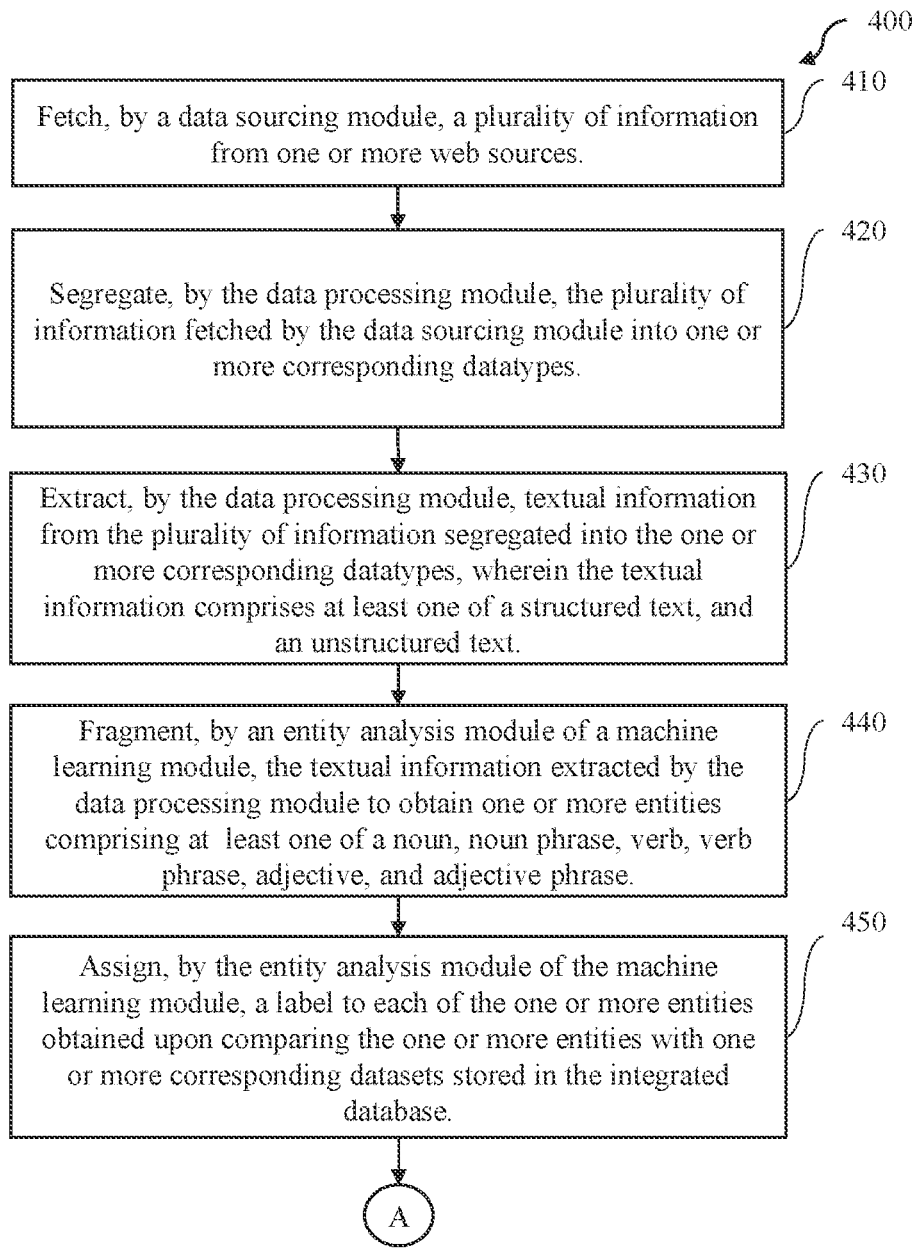
FIG. 5a is a flow chart representing the steps involved in a method to identify cyber threat intelligence from a group of information in accordance with an embodiment of the present disclosure.
Figure 5B:
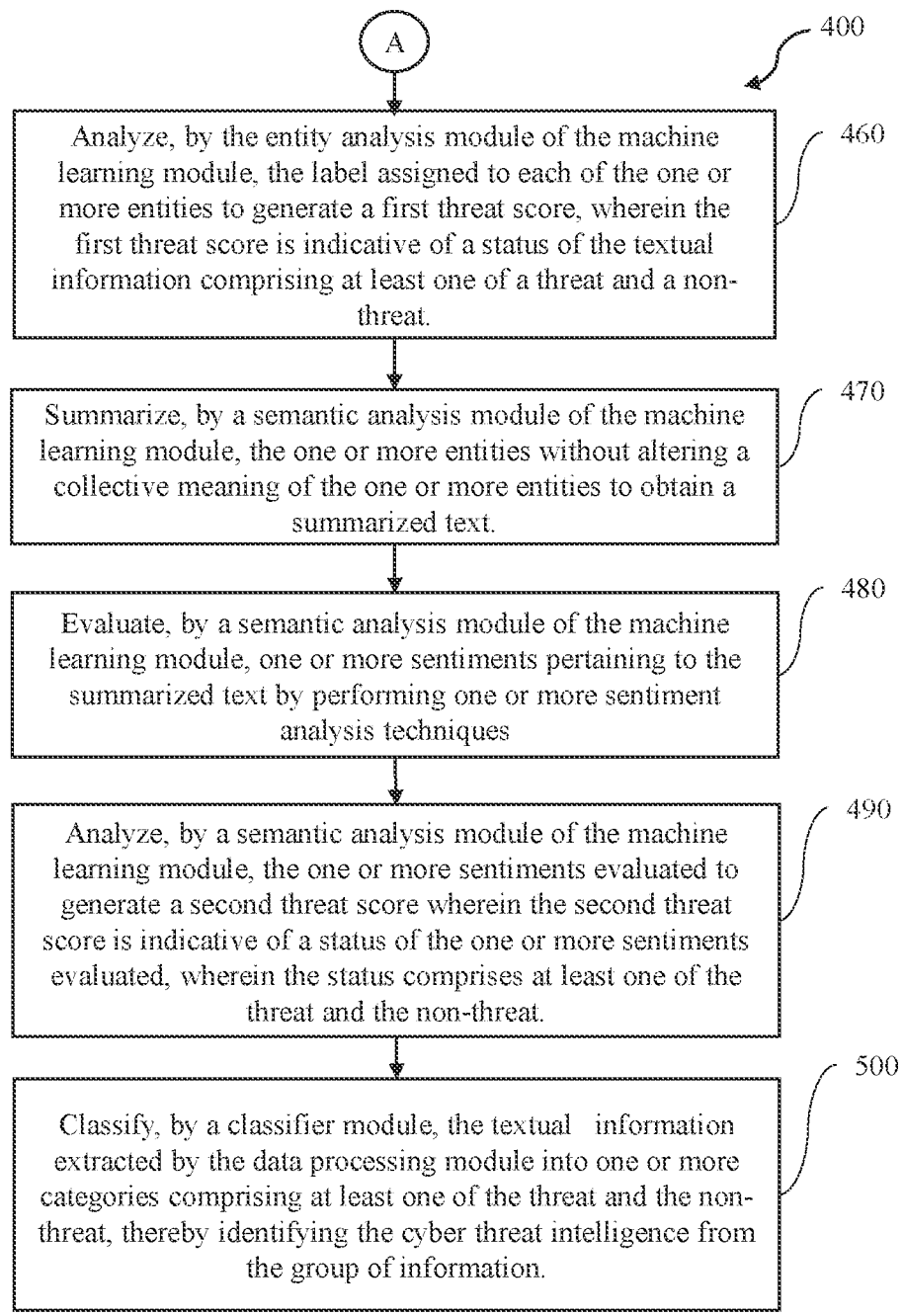
FIG. 5b is a flow chart representing the continued steps involved in a method of FIG. 5a, in accordance with an embodiment of the present disclosure.

FIG. 5a and FIG. 5b is a flow chart representing the steps involved in a method 400 to identify cyber threat intelligence from a group of information in accordance with an embodiment of the present disclosure. The method 400 includes fetching a group of information from one or more web sources in step 410. In one embodiment, fetching a group of information from one or more web sources includes fetching a group of information from one or more web sources by a data sourcing module. As used herein, the group of information may include, news snippets, visuals, images, audio files, information from web forums, information from telegram channels and the like. In a specific embodiment, the one or more web sources may include open web, deep web and dark web. In one embodiment, the data sourcing module may be configured to employ a vector embedding technique to fetch the group of information based on a predefined search key.

The method 400 also includes segregating the group of information fetched by the data sourcing module into one or more corresponding datatypes in step 420. In one embodiment, segregating the group of information fetched by the data sourcing module into one or more corresponding datatypes includes segregating the group of information fetched by the data sourcing module into one or more corresponding datatypes by the data processing module. In one embodiment, the one or more corresponding datatypes may include text, power point presentation, portable document format (PDF), image, audio, video, and database.

The method 400 also includes extracting textual information from the group of information segregated into the one or more corresponding datatypes in step 430. In one embodiment, extracting textual information from the group of information segregated into the one or more corresponding datatypes includes extracting textual information from the group of information segregated into the one or more corresponding datatypes by the data processing module. The textual information includes at least one of a structured text, and an unstructured text. In a specific embodiment, the structured text may include comma separated values and java script object notification.

The method 400 also includes fragmenting the textual information extracted by the data processing module to obtain one or more entities comprising at least one of a noun, noun phrase, verb, verb phrase, adjective, and adjective phrase in step 440. In one embodiment, fragmenting the textual information extracted by the data processing module to obtain one or more entities comprising at least one of a noun, noun phrase, verb, verb phrase, adjective, and adjective phrase includes fragmenting the textual information extracted by the data processing module to obtain one or more entities comprising at least one of a noun, noun phrase, verb, verb phrase, adjective, and adjective phrase by an entity analysis module of a machine learning module.

The method 400 also includes assigning a label to each of the one or more entities obtained upon comparing the one or more entities with one or more corresponding datasets stored in the integrated database in step 450. In one embodiment, assigning a label to each of the one or more entities obtained upon comparing the one or more entities with one or more corresponding datasets stored in the integrated database includes assigning a label to each of the one or more entities obtained upon comparing the one or more entities with one or more corresponding datasets stored in the integrated database by the entity analysis module. In one embodiment, the one or more corresponding datasets may include keywords that may be perceived as a potential threat for a particular organization.

The method 400 also includes analyzing the label assigned to each of the one or more entities to generate a first threat score in step 460. In one embodiment, analyzing the label assigned to each of the one or more entities to generate a first threat score includes analyzing the label assigned to each of the one or more entities to generate a first threat score by the entity analysis module of the machine learning module. The first threat score is indicative of a status of the textual information including at least one of a threat and a non-threat. In one embodiment, the entity analysis module may be trained by one or more machine learning techniques to classify the one or more entities into one or more categories including at least one of the threat and the non-threat. In such an embodiment, the one or more machine learning techniques may include provide one or more textual information including a corresponding label to the entity analysis module.

Further, the one or more textual information may include one or more corresponding entities. The one or more machine learning techniques may also include assign the corresponding label of the one or more corresponding textual information to each of the one or more corresponding entities extracted. The one or more machine learning techniques may further include calculate a threshold value corresponding to the one or more entities extracted based on the corresponding label assigned. The one or more machine learning technique may also classify the one or more entities into one or more categories based on the corresponding threshold value calculated. In one embodiment, the entity analysis module may be configured to generate the first threat score corresponding to each of the one or more entities. In some embodiments, the entity analysis module may be configured to generate the first threat score upon grouping the one or more entities as monograms, bigrams, and trigrams.

The method 400 also includes summarizing the one or more entities without altering a collective meaning of the one or more entities to obtain a summarized text in step 470. In one embodiment, summarizing the one or more entities without altering a collective meaning of the one or more entities to obtain a summarized text includes summarizing the one or more entities without altering a collective meaning of the one or more entities to obtain a summarized text by a semantic analysis module of the machine learning module. In one embodiment, the semantic analysis module may be configured to summarize the one or more entities by at least one of a technique comprising extractive summarization and abstractive summarization.

The method 400 also includes evaluating one or more sentiments pertaining to the summarized text by performing one or more sentiment analysis techniques in step 480. In one embodiment, evaluating one or more sentiments pertaining to the summarized text by performing one or more sentiment analysis techniques includes evaluating one or more sentiments pertaining to the summarized text by performing one or more sentiment analysis techniques by the semantic analysis module of the machine learning module.

The method 400 also includes analyzing the one or more sentiments evaluated to generate a second threat score in step 490. In one embodiment, analyzing the one or more sentiments evaluated to generate a second threat score includes analyzing the one or more sentiments evaluated to generate a second threat score by the semantic analysis module of the machine learning module. The second threat score is indicative of a status of the one or more sentiments evaluated. The status includes at least one of the threat and the non-threat. In one embodiment, the one or more sentiment analysis techniques may include native bayes technique, valence aware dictionary technique, long short term memory technique. In some embodiments, the one or more sentiments may include a positive sentiment, and a negative sentiment. In such an embodiment, the positive sentiment, and the negative sentiment may include a contextual meaning comprising the threat, and the non-threat respectively.

Further, in one embodiment, the semantic analysis module may be trained by one or more machine learning techniques to generate the second threat score by analyzing the one or more sentiments. In one embodiment, the one or more machine learning techniques may include provide one or more textual information including threat data to the semantic analysis module. The one or more machine learning techniques may also include compare one or more sentiments of the summarized text with the one or more sentiments of the one or more textual information provided. The one or more machine learning techniques may further include generate the second threat score corresponding to the summarized text upon matching the one or more sentiments of the summarized text with the one or more sentiments of the one or more textual information provided. In one embodiment, the entity analysis module and the semantic analysis module may employ one or more corresponding weighted functions to generate the first threat score and the second threat score.

The method 400 includes classifying the textual information extracted by the data processing module into one or more categories comprising at least one of the threat and the non-threat, thereby identifying the cyber threat intelligence from the group of information in step 500. In one embodiment, classifying the textual information extracted by the data processing module into one or more categories comprising at least one of the threat and the non-threat, thereby identifying the cyber threat intelligence from the group of information includes classifying the textual information extracted by the data processing module into one or more categories comprising at least one of the threat and the non-threat, thereby identifying the cyber threat intelligence from the group of information by a classifier module. In one embodiment, the classifier module may be configured to classify the textual information as the threat when at least one of the first threat score and the second threat score is above a predefined threshold.

It should be noted that the method 400 described herein is executed in conjunction with a computer network, such as internal network within a company, corporation, agency, administration or other organizations to asynchronously detect security threats.

Various embodiments of the system and method to identify cyber threat intelligence from a group of information described above enable various advantages. Provision of the data sourcing module enables fetching the group of information from the one or more web sources, thereby reducing the amount of workforce required for gathering the group of information. Provision of the data processing module enables segregation of the group of information and extraction of textual information, thereby accelerating the process of identifying the cyber threat intelligence. Provision of the machine learning module, the entity analysis module and the semantic analysis module enables accurate prediction of the textual information that may be perceived as the threat or the non-threat thereby providing accurate information to the security analysts by reducing false positives. Further, the user feedback module enables a user to finetune the identification process specific to a particular organization by providing the one or more inputs. Apart from that, fetching the group of information by the vector embedding technique is capable of providing accurate and relevant information.

Also, the system is more reliable and more efficient because the one or more devices registered on the integrated platform remain always connected and reachable to the one or more users. Further, from a technical effect point of view, the implementation time required to perform the method steps included in the present disclosure by the one or more processors of the system is very minimal, thereby the system maintains very minimal operational latency and requires very minimal processing requirements.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system to identify cyber threat intelligence from a group of information comprising:
    a processing subsystem hosted on a server and configured to execute on a network to control bidirectional communications among a plurality of modules comprising:
        a data sourcing module operatively coupled to an integrated database, wherein the data sourcing module is configured to fetch the group of information from one or more web sources;
        a data processing module operatively coupled to the data sourcing module, wherein the data processing module is configured to:
            segregate the group of information fetched by the data sourcing module into one or more corresponding datatypes;
            extract textual information from the group of information segregated into the one or more corresponding datatypes, wherein the textual information comprises at least one of a structured text, and an unstructured text;
a machine learning module operatively coupled to the data processing module, wherein the machine learning module comprises:
an entity analysis module operatively coupled to the data processing module, wherein the entity analysis module is configured to:
fragment the textual information extracted by the data processing module to obtain one or more entities comprising at least one of a noun, noun phrase, verb, verb phrase, adjective, and adjective phrase;
assign a label to each of the one or more entities obtained upon comparing the one or more entities with one or more corresponding datasets stored in the integrated database;
analyze the label assigned to each of the one or more entities to generate a first threat score, wherein the first threat score is indicative of a status of the textual information comprising at least one of a threat and a non-threat,
wherein the entity analysis module is trained by one or more machine learning techniques to classify the one or more entities into one or more categories comprising at least one of the threat and the non-threat, wherein the one or more machine learning techniques comprises:
provide one or more textual information comprising a corresponding label to the entity analysis module, wherein the one or more textual information comprises one or more corresponding entities;
extract the one or more corresponding entities from the one or more corresponding textual information provided;
assign the corresponding label of the one or more corresponding textual information to each of the one or more corresponding entities extracted;
calculate a threshold value corresponding to the one or more entities extracted based on the corresponding label assigned; and
classify the one or more entities into one or more categories based on the corresponding threshold value calculated;
a semantic analysis module operatively coupled to the entity analysis module, wherein the semantic analysis module is configured to:
summarize the one or more entities without altering a collective meaning of the one or more entities to obtain a summarized text;
evaluate one or more sentiments pertaining to the summarized text by performing one or more sentiment analysis techniques;
analyze the one or more sentiments evaluated to generate a second threat score wherein the second threat score is indicative of a status of the one or more sentiments evaluated, wherein the status comprises at least one of the threat and the non-threat; and
a classifier module operatively coupled to the semantic analysis module and the entity analysis module, wherein the classifier module is configured to classify the textual information extracted by the data processing module into one or more categories comprising at least one of the threat and the non-threat, thereby identifying the cyber threat intelligence from the group of information.

2. The system as claimed in claim 1, wherein the network comprises one or more terrestrial networks and one or more satellite networks configured to communicatively connect a user device to web server engine and a web crawler.

3. The system as claimed in claim 2, wherein the one or more terrestrial networks comprises a global system for mobile communications, code division multiple access, and enhanced data for global evolution network.

4. The system as claimed in claim 1, wherein the semantic analysis module is trained by one or more machine learning techniques to generate the second threat score by analyzing the one or more sentiments, wherein the one or more machine learning techniques comprises:
provide one or more textual information comprising threat data to the semantic analysis module;
compare one or more sentiments of the summarized text with the one or more sentiments of the one or more textual information provided; and
generate the second threat score corresponding to the summarized text upon matching the one or more sentiments of the summarized text with the one or more sentiments of the one or more textual information provided.

5. The system as claimed in claim 1, wherein the data sourcing module is configured to employ a vector embedding technique to fetch the group of information based on a predefined search key.

6. The system as claimed in claim 1, wherein the one or more web sources comprises open web, deep web and dark web.

7. The system as claimed in claim 1, wherein the one or more corresponding datatypes comprises text, power point presentation, portable document format, image, audio, video, and database.

8. The system as claimed in claim 1, wherein the structured text comprises comma separated values and java script object notification.

9. The system as claimed in claim 1, wherein the entity analysis module and the semantic analysis module employs one or more corresponding weighted functions to generate the first threat score and the second threat score.

10. The system as claimed in claim 1, wherein the entity analysis module is configured to generate the first threat score corresponding to each of the one or more entities.

11. The system as claimed in claim 1, wherein the entity analysis module is configured to generate the first threat score upon grouping the one or more entities as monograms, bigrams, and trigrams.

12. The system as claimed in claim 1, wherein the semantic analysis module is configured to summarize the one or more entities by at least one of a technique comprising extractive summarization and abstractive summarization.

13. The system as claimed in claim 1, wherein the one or more sentiment analysis techniques comprises native bayes technique, valence aware dictionary technique, long short term memory technique.

14. The system as claimed in claim 1, wherein the one or more sentiments comprises a positive sentiment, and a negative sentiment, wherein the positive sentiment, and the negative sentiment comprises a contextual meaning comprising the threat, and the non-threat respectively.

15. The system as claimed in claim 1, wherein the classifier module is configured to classify the textual information as the threat when at least one of the first threat score and the second threat score is above a predefined threshold.

16. The system as claimed in claim 1, wherein the processing system comprises a user feedback module configured to fine tune the first threat score generated by the entity analysis module, the second threat score generated by the semantic analysis module, and the classification done by the classifier module upon receiving one or more inputs from one or more corresponding users.

17. The system as claimed in claim 16, wherein the user feedback module is configured to fine tune the first threat score, the second threat score, and the classification done by the classifier module based on an organization specific data upon receiving one or more inputs from the one or more corresponding users.

18. A method to identify cyber threat intelligence from a group of information comprising:
   fetching, by a data sourcing module, a group of information from one or more web sources;
   segregating, by the data processing module, the group of information fetched by the data sourcing module into one or more corresponding datatypes;
   extracting, by the data processing module, textual information from the group of information segregated into the one or more corresponding datatypes, wherein the textual information comprises at least one of a structured text, and an unstructured text;
   fragmenting, by an entity analysis module of a machine learning module, the textual information extracted by the data processing module to obtain one or more entities comprising at least one of a noun, noun phrase, verb, verb phrase, adjective, and adjective phrase;
   assigning, by the entity analysis module of the machine learning module, a label to each of the one or more entities obtained upon comparing the one or more entities with one or more corresponding datasets stored in the integrated database;
   analyzing, by the entity analysis module of the machine learning module, the label assigned to each of the one or more entities to generate a first threat score, wherein the first threat score is indicative of a status of the textual information comprising at least one of a threat and a non-threat;
   training the entity analysis module by one or more machine learning techniques for classifying the one or more entities into one or more categories comprising at least one of the threat and the non-threat, wherein the one or more machine learning techniques comprises:
      providing one or more textual information comprising a corresponding label to the entity analysis module, wherein the one or more textual information comprises one or more corresponding entities;
      extracting the one or more corresponding entities from the one or more corresponding textual information provided;
      assigning the corresponding label of the one or more corresponding textual information to each of the one or more corresponding entities extracted;
      calculating a threshold value corresponding to the one or more entities extracted based on the corresponding label assigned; and
      classifying the one or more entities into one or more categories based on the corresponding threshold value calculated;
   summarizing, by a semantic analysis module of the machine learning module, the one or more entities without altering a collective meaning of the one or more entities to obtain a summarized text;
   evaluating, by the semantic analysis module of the machine learning module, one or more sentiments pertaining to the summarized text by performing one or more sentiment analysis techniques;
   analyzing, by the semantic analysis module of the machine learning module, the one or more sentiments evaluated to generate a second threat score, wherein the second threat score is indicative of a status of the one or more sentiments evaluated, wherein the status comprises at least one of the threat and the non-threat; and
   classifying, by a classifier module, the textual information extracted by the data processing module into one or more categories comprising at least one of the threat and the non-threat, thereby identifying the cyber threat intelligence from the group of information.

19. A non-transitory computer-readable medium storing a computer program that, when executed by a processor, causes the processor to perform a method to identify cyber threat intelligence from a group of information, wherein the method comprises:
   fetching, by a data sourcing module, a group of information from one or more web sources;
   segregating, by the data processing module, the group of information fetched by the data sourcing module into one or more corresponding datatypes;
   extracting, by the data processing module, textual information from the group of information segregated into the one or more corresponding datatypes, wherein the textual information comprises at least one of a structured text, and an unstructured text;
   fragmenting, by an entity analysis module of a machine learning module, the textual information extracted by the data processing module to obtain one or more entities comprising at least one of a noun, noun phrase, verb, verb phrase, adjective, and adjective phrase;
   assigning, by the entity analysis module of the machine learning module, a label to each of the one or more entities obtained upon comparing the one or more entities with one or more corresponding datasets stored in the integrated database;
   analyzing, by the entity analysis module of the machine learning module, the label assigned to each of the one or more entities to generate a first threat score, wherein the first threat score is indicative of a status of the textual information comprising at least one of a threat and a non-threat;
   training the entity analysis module by one or more machine learning techniques for classifying the one or more entities into one or more categories comprising at least one of the threat and the non-threat, wherein the one or more machine learning techniques comprises:
      providing one or more textual information comprising a corresponding label to the entity analysis module, wherein the one or more textual information comprises one or more corresponding entities;
      extracting the one or more corresponding entities from the one or more corresponding textual information provided;
      assigning the corresponding label of the one or more corresponding textual information to each of the one or more corresponding entities extracted;
      calculating a threshold value corresponding to the one or more entities extracted based on the corresponding label assigned; and classifying the one or more entities into one or more categories based on the corresponding threshold value calculated;

summarizing, by a semantic analysis module of the machine learning module, the one or more entities without altering a collective meaning of the one or more entities to obtain a summarized text;

evaluating, by a semantic analysis module of the machine learning module, one or more sentiments pertaining to the summarized text by performing one or more sentiment analysis techniques;

analyzing, by a semantic analysis module of the machine learning module, the one or more sentiments evaluated to generate a second threat score wherein the second threat score is indicative of a status of the one or more sentiments evaluated, wherein the status comprises at least one of the threat and the non-threat; and classifying, by a classifier module, the textual information extracted by the data processing module into one or more categories comprising at least one of the threat and the non-threat, thereby identifying the cyber threat intelligence from the group of information.

\* \* \* \* \*